(12) United States Patent
Alizadeh-Khiavi et al.

(10) Patent No.: US 7,763,098 B2
(45) Date of Patent: Jul. 27, 2010

(54) RAPID CYCLE SYNGAS PRESSURE SWING ADSORPTION SYSTEM

(75) Inventors: Soheil Alizadeh-Khiavi, Burnaby (CA); James A. Sawada, Vancouver (CA); Andrea C. Gibbs, Burnaby (CA); Jeffrey Alvaji, West Vancouver (CA)

(73) Assignee: Xebec Adsorption Inc., Burnaby, British Columbia (CA)

( * ) Notice: Subject to any disclaimer, the term of this patent is extended or adjusted under 35 U.S.C. 154(b) by 732 days.

(21) Appl. No.: 11/559,514

(22) Filed: Nov. 14, 2006

(65) Prior Publication Data
US 2007/0125228 A1    Jun. 7, 2007

Related U.S. Application Data

(60) Provisional application No. 60/737,881, filed on Nov. 18, 2005.

(51) Int. Cl.
*B01D 53/02* (2006.01)
(52) U.S. Cl. .................. 95/96; 95/100; 95/103; 95/140
(58) Field of Classification Search ............ 95/96, 95/100, 103, 140; 96/130
See application file for complete search history.

(56) References Cited

U.S. PATENT DOCUMENTS

| | | | |
|---|---|---|---|
| 3,564,816 A | 2/1971 | Batta | |
| 3,986,849 A | 10/1976 | Fuderer et al. | |
| 6,051,050 A | 4/2000 | Keefer et al. | |
| 6,056,804 A | 5/2000 | Keefer et al. | |
| 6,063,161 A | 5/2000 | Keefer et al. | |
| 6,176,897 B1 | 1/2001 | Keefer | |
| 6,406,523 B1 | 6/2002 | Connor et al. | |
| 6,451,095 B1 | 9/2002 | Keefer et al. | |
| 6,514,319 B2 | 2/2003 | Keefer et al. | |
| 6,565,627 B1 * | 5/2003 | Golden et al. ................ | 95/96 |
| 6,565,635 B2 | 5/2003 | Keefer et al. | |
| 6,660,064 B2 | 12/2003 | Golden et al. | |
| 6,692,626 B2 | 2/2004 | Keefer et al. | |
| RE38,493 E | 4/2004 | Keefer et al. | |
| 6,742,507 B2 | 6/2004 | Keefer et al. | |
| 6,866,950 B2 | 3/2005 | Connor et al. | |
| 6,902,602 B2 | 6/2005 | Keefer et al. | |
| 6,921,597 B2 | 7/2005 | Keefer et al. | |
| 7,037,358 B2 | 5/2006 | Babicki et al. | |
| 7,041,272 B2 | 5/2006 | Keefer et al. | |
| 7,087,331 B2 | 8/2006 | Keefer et al. | |
| 7,094,275 B2 | 8/2006 | Keefer et al. | |
| 7,097,925 B2 | 8/2006 | Keefer | |
| 7,160,367 B2 | 1/2007 | Babicki et al. | |
| 7,189,280 B2 | 3/2007 | Alizadeh-Khiavi et al. | |
| 7,250,073 B2 | 7/2007 | Keefer et al. | |
| 7,250,150 B1 | 7/2007 | Keefer et al. | |
| 7,300,905 B2 | 11/2007 | Keefer et al. | |
| RE40,006 E | 1/2008 | Keefer et al. | |
| 7,387,849 B2 | 6/2008 | Keefer et al. | |
| 7,404,846 B2 * | 7/2008 | Golden et al. ................ | 95/103 |
| 2003/0157390 A1 | 8/2003 | Keefer et al. | |
| 2004/0197612 A1 | 10/2004 | Keefer et al. | |
| 2005/0052937 A1 | 3/2005 | Matsuura | |
| 2006/0074343 A1 | 4/2006 | Hibner | |
| 2006/0169142 A1 | 8/2006 | Rode et al. | |
| 2006/0182680 A1 | 8/2006 | Keefer et al. | |
| 2006/0257708 A1 | 11/2006 | Keefer et al. | |
| 2006/0280993 A1 | 12/2006 | Keefer et al. | |
| 2007/0002463 A1 | 1/2007 | Shintani et al. | |
| 2007/0125228 A1 | 6/2007 | Alizadeh-Khiavi et al. | |
| 2007/0253872 A1 | 11/2007 | Keefer et al. | |
| 2007/0261551 A1 | 11/2007 | Sawada et al. | |
| 2009/0025553 A1 | 1/2009 | Keefer et al. | |

FOREIGN PATENT DOCUMENTS

| | | |
|---|---|---|
| WO | 02/24309 | 3/2002 |
| WO | 2006/133576 | 12/2006 |
| WO | 2008/051606 | 5/2008 |

* cited by examiner

*Primary Examiner*—Robert A Hopkins
(74) *Attorney, Agent, or Firm*—Klarquist Sparkman, LLP

(57) ABSTRACT

Embodiments of a rapid cycle PSA apparatus are described that are useful for producing a hydrogen enriched product gas comprising not more than about 50 ppm carbon monoxide by volume and with a hydrogen gas recovery of at least about 70% by adsorptive separation from a syngas feed gas mixture comprising at least about 50 percent hydrogen and at least about 1 percent carbon monoxide by volume. One disclosed embodiment of a rapid cycle PSA apparatus comprised at least 3 adsorber elements each having at least one thin adsorbent sheet material which comprises at least one adsorbent material therein, and a bed size factor less than about 4.0 seconds. Embodiments of a rapid cycle PSA process also are described that utilize disclosed embodiments of the rapid-cycle PSA device.

16 Claims, No Drawings

RAPID CYCLE SYNGAS PRESSURE SWING ADSORPTION SYSTEM

CROSS REFERENCE TO RELATED APPLICATION

This application claims the benefit of the earlier filing date of U.S. Provisional Application No. 60/737,881, filed on Nov. 18, 2005.

FIELD

The present disclosure relates to pressure swing adsorption (PSA) systems, and more particularly to rapid cycle pressure swing adsorption (RCPSA) systems for separation of syngas mixtures.

BACKGROUND

The process of production and recovery of hydrogen by steam and/or air reforming of hydrocarbon rich fuels is known in the art. Typical commercial sources for the production of hydrogen include steam reforming or partial oxidation of various hydrocarbon fuels, both liquid and gaseous. Common reforming techniques are carried out by reacting the hydrocarbon fuel with steam and/or with air or oxygen-enriched air, producing a hydrogen gas-containing syngas stream, which also typically may contain non-hydrogen components comprising carbon monoxide, carbon dioxide, water, residual hydrocarbon fuel or nitrogen. Typically in conventional hydrogen production systems, carbon monoxide in the syngas stream may be at least partially converted to carbon dioxide by means of the water gas shift reaction to increase the content of hydrogen in the syngas stream, while reducing the content of carbon monoxide (may be reduced to as low as about 1% CO in reformate after typical high and low temperature water gas shift reactions). Conventionally this water gas-shifted syngas stream is then sent to a PSA unit for purification of the hydrogen component to produce a hydrogen-rich product gas.

Conventional PSA systems such as are known in the art may be employed for the purification of the hydrogen component of a reformate syngas stream to provide a hydrogen-rich product gas. Such conventional PSA systems typically function by passing a multi-component feed gas mixture through multiple adsorber beds (each comprising at least one adsorbent material) in a progressive cyclic phase, adsorbing at least one relatively strongly adsorbed component at an elevated pressure, while at least one relatively weakly adsorbed component passes through the bed to be delivered as an enriched product gas. In the case of hydrogen production from reformate syngas streams, such relatively weakly adsorbed component typically comprises hydrogen gas. Following the above described adsorption step, adsorbers in a conventional PSA system are typically depressurized in one or more steps, during which enriched product gas may be further extracted from the adsorber, typically followed by countercurrent desorption and purge prior to resuming the next cyclic feed or adsorption step of the adsorber. Exemplary publications disclosing such conventional PSA systems may include U.S. Pat. Nos. 3,564,816 to Batta and U.S. Pat. No. 3,986,849 to Fuderer et. al.

An expanding field of application for enriched hydrogen use is as fuel for fuel cell power generation systems. In particular, PEM type fuel cells, a major type of fuel cell developed for power generation, automotive and other uses, require enriched hydrogen as a fuel, and particularly require hydrogen fuel with low carbon monoxide levels (typically less than about 50 ppm by volume) to avoid poisoning the fuel cell, which is very sensitive to contamination by carbon monoxide. Preferential oxidation reactors are known in the art for use to reduce the carbon monoxide concentration of reformate gas streams to levels suitable for use in some PEM type fuel cell systems, however some such preferential oxidation reactors are limited by the relatively long startup and response times required for the reactor to react to changes in the reformate stream. PSA is also known for use to purify reformate synthesis gas to reduce carbon monoxide levels in an enriched hydrogen fuel gas suitable for PEM fuel cell use.

In order to reduce the capital cost and physical size of PSA systems, it is known in the art to employ rapid cycle PSA to reduce the required adsorber volume (and therefore the size and cost of the PSA) to produce a desired volume of enriched hydrogen product gas in a given time (known as bed size factor or BSF, which may be expressed in units of volume of adsorber/volume of product gas produced/second). Such rapid PSA cycles as disclosed in U.S. Pat. No. 6,660,064 to Golden et. al. are claimed to provide enriched hydrogen product gas from reformate syngas according to computer simulations of pressure swing adsorption using known granular carbon adsorbent materials. The disclosed pressure swing adsorption system is capable to operate at cycle speeds up to approximately 1.3 cycles per minute (corresponding approximately to 45 second cycle durations with as low as 15 second feed intervals). The relatively short response times of such rapid cycle PSA systems to changes in the reformate feed gas stream, in comparison to non-adsorptive alternative systems such as preferential oxidation reactors, may provide an advantage for use in fuel cell systems where start/stop, or other changes in the reformate feed to the purification system may occur.

Despite the developments in the art noted above, it is desired to provide improved rapid cycle PSA systems for producing enriched hydrogen product gas from reformate syngas mixtures.

SUMMARY

In an embodiment according to the present invention a rapid cycle PSA apparatus is provided for producing a hydrogen enriched product gas comprising not more than about 50 ppm carbon monoxide by volume, and with at least about 70% recovery of hydrogen gas from a syngas feed gas mixture comprising at least about 50 percent hydrogen and at least about 1 percent carbon monoxide by volume, the rapid cycle PSA apparatus comprising at least 3 adsorber elements each comprising at least one thin adsorbent sheet material, where each thin adsorbent sheet comprises at least one adsorbent material therein, and a bed size factor (BSF defined as the volume of adsorber elements/{volume of product gas produced/second}) less than about 4.0 seconds. In a particular exemplary embodiment, the hydrogen enriched product gas may comprise not more than about 10 ppm carbon monoxide by volume.

In another embodiment of the present invention, a rapid cycle PSA process is provided for producing a hydrogen enriched product gas from a syngas feed gas mixture comprising: supplying a rapid cycle PSA apparatus comprising at least 3 adsorber elements each comprising at least one thin adsorbent sheet material where each thin adsorbent sheet comprises at least one adsorbent material therein, supplying a syngas feed gas mixture comprising at least about 50 percent hydrogen and at least about 1 percent carbon monoxide by volume to the rapid cycle PSA apparatus and thereby the adsorber elements therein, and recovering a hydrogen enriched product gas from the rapid cycle PSA apparatus comprising not more than about 50 ppm carbon monoxide by volume with a hydrogen recovery of at least about 70%, wherein the bed size factor of the rapid cycle PSA process is less than about 4.0 seconds. In a particular exemplary embodiment, the hydrogen enriched product gas may comprise not more than about 10 ppm carbon monoxide by volume.

DETAILED DESCRIPTION OF SEVERAL EMBODIMENTS

In the rapid cycle PSA apparatus and process of the present invention, it is desired to reduce the size of the PSA apparatus required to enrich the hydrogen content of a given flow rate of reformate syngas feed gas, while reducing the carbon monoxide content of the syngas to below about 50 ppm by volume. Such reduction of size of the PSA apparatus is desirable to reduce the cost of the PSA apparatus relative to its capacity, and is particularly desirable for applications where the size of the PSA apparatus must be as small as possible due to space constraints. Such applications may include the enrichment of hydrogen from syngas for use as fuel in fuel cell power generation equipment, and particularly for enrichment of hydrogen from syngas for use as fuel in PEM fuel cell power systems installed onboard transportation vehicles such as automobiles, trucks, boats etc., where space is a particular constraint. In such applications, it is desirable to reduce the size of the PSA apparatus to the smallest size possible to provide an enriched hydrogen product gas with less than about 50 ppm carbon monoxide suitable for use as fuel in a PEM fuel cell, and in certain embodiments, to provide the enriched hydrogen product gas with less than about 10 ppm carbon monoxide. Therefore it is an object of the present invention to reduce the size of the rapid cycle PSA apparatus, and in particular the size of the adsorbent beds of the rapid cycle PSA apparatus, relative to its product gas flow capacity. A common measure of the size of the adsorbent beds of a PSA relative to the product gas flow capacity of the PSA is the bed size factor (BSF) which is equal to the total combined volume of the PSA adsorbent beds, divided by the product gas flow rate per second, or stated in an equation, BSF={total vol. of adsorbent beds}/{vol. of product gas produced/second}. Therefore, it is an object of the present invention to reduce the BSF of the rapid cycle PSA apparatus relative to the prior art, while maintaining a desired hydrogen product gas purity of less than about 50 ppm carbon monoxide with a hydrogen recovery of at least about 70%, and in certain embodimnents, less than about 10 ppm carbon monoxide.

Table 1 indicates the relationship between BSF and rapid cycle PSA cycle speed (in cycles per minute) resulting from experimental tests performed using rapid cycle PSAs according to the present invention to produce a hydrogen enriched product gas containing approximately 99% $H_2$, less than 1% $CO_2$ and less than 50 ppm CO with a hydrogen gas recovery of greater than 70%, from a catalytic steam reformer reformate feed gas stream containing approximately 72% $H_2$, 19% $CO_2$, and 9% CO at approximately 80° C. and a feed pressure of approximately 15 bar. It can be seen from Table 1 that in the inventive embodiments, higher PSA cycle speed (and therefore shorter cycle duration) corresponds to a lower PSA BSF. In further exemplary embodiments according to the invention, the feed pressure may desirably range between about 12-18 bar.

TABLE 1

| Rapid Cycle PSA cycle speed (cycles per minute) | Bed Size Factor of Rapid Cycle PSA (seconds) |
|---|---|
| 5 | 0.91 |
| 10 | 0.55 |
| 15 | 0.44 |

In an embodiment of the present invention, an improved rapid cycle pressure swing adsorption (PSA) apparatus is provided for the adsorptive enrichment of hydrogen product gas from a syngas feed gas mixture comprising at least about 50% hydrogen and at least about 1% carbon monoxide to produce an enriched hydrogen product gas comprising less than about 50 ppm carbon monoxide and with a hydrogen recovery greater than about 70%, wherein the BSF of the PSA is less than about 4.0 seconds, thus advantageously reducing the size of the PSA adsorbent beds relative to the volume rate of enriched hydrogen fuel gas produced. Accordingly, due to the relative size reduction of the PSA adsorbent beds, the overall size of the PSA apparatus may also be advantageously reduced, which is an object of the present invention, as discussed above. In a particular exemplary embodiment, and the enriched hydrogen product gas may desirably comprise less than about 10 ppm carbon monoxide.

According to an embodiment of the invention, the syngas feed gas mixture may comprise a reformate syngas stream from a reformer, such as a catalytic steam reformer, catalytic partial oxidation reformer, or autothermal reformer, such as are known in the art. Such reformers may preferably reform gaseous or liquid hydrocarbon based fuels such as methane, natural gas, propane, gasoline, diesel, or kerosene for example, to produce a reformate syngas mixture suitable for use as a feed gas in the rapid cycle PSA apparatus according to the invention, wherein the syngas feed gas mixture comprises at least about 50% hydrogen and at least about 1% carbon monoxide by volume. One exemplary type of reformer which may be suitable for producing a reformate syngas for supply to the rapid cycle PSA apparatus of the present invention is a cyclic pressure swing catalytic steam reformer, such as disclosed in US Patent Application Publication No. 2004/0191166A1, which may preferably reform hydrocarbon fuels, such as but not limited to gasoline, diesel or other liquid hydrocarbon fuels to produce a hydrogen-rich syngas comprising at least about 50% hydrogen and at least about 1% carbon monoxide by volume. Depending upon the type of fuel and reforming reaction used to produce the reformate syngas and the operating characteristics of the reforming system, the hydrogen component of the resulting syngas mixture may typically comprise between about 50-75% of the mixture. Also depending upon the type of fuel and reforming reaction used, the carbon monoxide component of the syngas mixture may typically comprise between about 1-15% of the mixture, depending additionally upon the presence and type of water gas shift reaction used to reduce the carbon monoxide content of the reformate syngas mixture prior to adsorptive purification in the rapid cycle PSA apparatus according to the present invention.

According to an exemplary embodiment of the present invention, the inventive rapid cycle PSA apparatus may comprise at least 6 adsorbent beds, each comprising at least one thin adsorbent sheet which comprises at least one adsorbent material therein, and a bed size factor (BSF) of less than about 4.0 seconds. The adsorbent material may comprise any suitable adsorbent material, such as but not limited to zeolite molecular sieve, alumina, and activated carbon based adsorbents known in the art which may be formed into the adsorbent sheet, which may thereafter be assembled into the adsorbent beds, such as by spirally winding the adsorbent sheet. Forming of exemplary such suitable adsorbent materials into exemplary suitable adsorbent sheets is known in the art and disclosed in the Applicant's US Patent Application Publication Number 2002/0170436A1, the contents of which are hereby incorporated by reference.

In experimental testing of the above exemplary embodiment of the inventive rapid cycle PSA apparatus, a syngas mixture from a pressure-swing cyclic catalytic steam reformer comprising approximately 72% hydrogen, 19% carbon dioxide and 9% carbon monoxide at approximately 80° C. and approximately 15 bar feed pressure was fed to a rapid cycle PSA apparatus according to the present invention having a BSF of approximately 0.91 seconds, for enrichment of the hydrogen content of the feed gas by adsorption. The adsorbent beds used in the experimental testing according to the present invention comprised approximately 7% activated alumina from UOP LLC, 13% 2GA activated carbon from Kuraray Co. Ltd., 40% 13X zeolite molecular sieve from UOP LLC, and 40% Ca exchanged LSX zeolite molecular sieve from CWK. A PSA cycle allowing 3 pressure equalizations as is known in the art was implemented to complete the experimental testing. Under such experimental conditions, the inventive rapid cycle PSA produced an enriched product gas comprising at least about 99% hydrogen, less than about 1% carbon dioxide, and less than about 50 ppm carbon monoxide by volume, and achieved a hydrogen recovery rate of approximately 80%.

In another embodiment of the present invention, the adsorbent materials incorporated into the at least one thin adsorbent sheet in each of the adsorbent beds of the inventive rapid cycle PSA apparatus may comprise any adsorbent materials known in the art which may be suitable to remove non-hydrogen impurities present in the syngas feed gas mixture, to produce the enriched hydrogen product gas. Such adsorbent materials may comprise for example and without limitation molecular sieves (including zeolite and titanosilicate based molecular sieve materials), carbons, aluminas, and silicas. Additionally, such exemplary adsorbent materials as disclosed above may further comprise other materials added to the base adsorbent materials by means of impregnation or other treatment methods, as is known in the art to enhance the desired adsorption characteristics of the base adsorbent materials relative to certain non-hydrogen impurities present in the syngas feed gas stream. In the particular case of carbon adsorbent materials (such as activated carbons), such other materials added to the base carbon adsorbent may include, for example and without limitation, metal salts, such as copper or silver salts, or metal oxides such as tin oxides, In a particular exemplary embodiment of the invention, the adsorbent material incorporated into the at least one thin adsorbent sheet in the adsorbent beds of the inventive rapid cycle PSA apparatus may comprise activated carbon adsorbent including a copper (I) or silver salt, or tin oxide added to the activated carbon by means of solid thermal dispersion, as is disclosed in the Applicant's previously filed U.S. Patent Application No. 60/625,371, the contents of which are hereby incorporated by reference. In such an exemplary embodiment, the activated carbon adsorbent may desirably have a specific surface area of about 600-1000 square meters/g or more, and may comprise a copper(I) or silver salt or tin oxide dispersed on the surface of the carbon in the amount of approximately 5-60% by weight.

While a PSA process cycle comprising 3 pressure equalizations was employed in the experimentally tested embodiment of the present invention described above, any PSA process cycle suitable for rapid cycle PSA application, and capable of achieving the required enriched hydrogen product gas specification of less than about 50 ppm carbon monoxide when integrated with a rapid cycle PSA apparatus according to the invention having a BSF of less than about 4.0 seconds and operating on a syngas feed gas mixture comprising at least about 50% hydrogen and 1% carbon monoxide, may be used, including other PSA process cycles known in the art.

The present invention has been described above in reference to several exemplary embodiments. It is understood that further modifications thereto and applications thereof may be made by a person skilled in the art without departing from the spirit and scope of the invention which are to be determined by the following claims.

What is claimed is:

1. A rapid cycle PSA apparatus for producing a hydrogen enriched product gas comprising not more than about 50 ppm carbon monoxide by volume and with a hydrogen gas recovery of at least about 70% by means of adsorptive separation from a syngas feed gas mixture comprising at least about 50 percent hydrogen and at least about 1 percent carbon monoxide by volume, the rapid cycle PSA apparatus comprising at least 3 adsorber elements each comprising at least one thin adsorbent sheet material comprising at least one adsorbent material, and a bed size factor less than about 4.0 seconds, wherein the bed size factor is equal to the combined volume of adsorber elements/{volume of product gas produced/second}.

2. The rapid cycle PSA apparatus according to claim 1 wherein the bed size factor is less than about 1.0 second.

3. The rapid cycle PSA apparatus according to claim 1 wherein the syngas feed gas mixture is a reformate syngas feed gas mixture generated by a cyclic pressure swing catalytic steam reformer.

4. The rapid cycle PSA apparatus according to claim 1 wherein the at least one adsorbent material is selected from zeolite molecular sieves, titanosilicate molecular sieves, carbons, silicas and aluminas.

5. The rapid cycle PSA apparatus according to claim 1 wherein the at least one adsorbent material comprises activated carbon additionally comprising a copper(I) or silver salt, or tin oxide dispersed thereon.

6. The rapid cycle PSA apparatus according to claim 3 wherein the at least one adsorbent material comprises activated carbon additionally comprising a copper(I) or silver salt, or tin oxide dispersed thereon.

7. The rapid cycle PSA apparatus according to claim 6 wherein the bed size factor is less than about 1.0 second.

8. A rapid cycle PSA process for producing a hydrogen enriched product gas by means of adsorptive separation from a syngas feed gas mixture, the process comprising:
providing a rapid cycle PSA apparatus comprising at least 3 adsorber elements each adsorber element comprising at least one thin adsorbent sheet material comprising at least one adsorbent material;
supplying a syngas feed gas mixture comprising at least about 50 percent hydrogen and at least about 1 percent carbon monoxide by volume to the adsorber elements; and
recovering a hydrogen enriched product gas from the adsorber elements of the rapid cycle PSA apparatus comprising not more than about 50 ppm carbon monoxide by volume with a hydrogen gas recovery of at least about 70%, wherein the bed size factor of the rapid cycle PSA process is less than about 4.0 seconds, wherein the bed size factor is equal to the combined volume of the adsorber elements/{volume of product gas produced/second}.

9. The rapid cycle PSA process according to claim 8 wherein the bed size factor of the process is less than about 1.0 second.

10. The rapid cycle PSA process according to claim 8 wherein the rapid cycle PSA apparatus comprises at least 6 adsorber elements.

11. The rapid cycle PSA process according to claim 8 wherein the rapid cycle PSA apparatus comprises at least 9 adsorber elements.

12. The rapid cycle PSA process according to claim 11 wherein the process additionally comprises at least 3 pressure equalization steps between adsorber elements per process cycle.

13. The rapid cycle PSA process according to claim 8, wherein the at least one adsorbent material is selected from zeolite molecular sieves, titanosilicate molecular sieves, carbons, silicas and aluminas.

14. The rapid cycle PSA process according to claim 8, wherein the at least one adsorbent material comprises activated carbon additionally comprising a copper(I) or silver salt, or tin oxide dispersed thereon.

15. A rapid cycle PSA apparatus for producing a hydrogen enriched product gas comprising not more than about 50 ppm carbon monoxide by volume and with a hydrogen gas recovery of at least about 70% by means of adsorptive separation from a reformate syngas feed mixture comprising at least about 50 percent hydrogen and at least about 1 percent carbon monoxide by volume generated from a cyclic pressure swing catalytic steam reformer, the rapid cycle PSA apparatus comprising 3 adsorber elements up to at least 9 adsorber elements, each adsorber element comprising at least one thin adsorbent sheet material and at least one adsorbent material comprising activated carbon additionally comprising a copper(I) or silver salt, or tin oxide dispersed thereon, and a bed size factor less than about 1 second, wherein the bed size factor is equal to the combined volume of adsorber elements/{volume of product gas produced/second}.

16. A rapid cycle PSA process for producing a hydrogen enriched product gas by means of adsorptive separation from a reformate syngas feed gas mixture, the process comprising:
providing a rapid cycle PSA apparatus comprising 3 adsorber elements up to at least 9 adsorber elements, each adsorber element comprising at least one thin adsorbent sheet material comprising at least one adsorbent material, the adsorbent material comprising activated carbon additionally comprising a copper (I) or silver salt, or tin oxide dispersed thereon;
supplying a syngas feed gas mixture comprising at least about 50 percent hydrogen and at least about 1 percent carbon monoxide by volume to the adsorber elements; and
recovering a hydrogen enriched product gas from the adsorber elements of the rapid cycle PSA apparatus comprising not more than about 50 ppm carbon monoxide by volume with a hydrogen gas recovery of at least about 70%, wherein the bed size factor of the rapid cycle PSA process is less than about 1 second, wherein the bed size factor is equal to the combined volume of the adsorber elements/{volume of product gas produced/second}.

\* \* \* \* \*